(12) United States Patent
Sato et al.

(10) Patent No.: US 10,464,576 B2
(45) Date of Patent: Nov. 5, 2019

(54) CONTROL DEVICE FOR HYBRID VEHICLE

(71) Applicant: TOYOTA JIDOSHA KABUSHIKI KAISHA, Toyota-shi, Aichi-ken (JP)

(72) Inventors: Daiki Sato, Toyota (JP); Yudai Suzuki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 78 days.

(21) Appl. No.: 15/699,509

(22) Filed: Sep. 8, 2017

(65) Prior Publication Data
US 2018/0086331 A1  Mar. 29, 2018

(30) Foreign Application Priority Data
Sep. 29, 2016  (JP) .................. 2016-192191

(51) Int. Cl.
*B60W 50/08* (2012.01)
*B60W 20/17* (2016.01)
(Continued)

(52) U.S. Cl.
CPC .......... *B60W 50/082* (2013.01); *B60K 6/445* (2013.01); *B60K 6/48* (2013.01); *B60W 20/13* (2016.01); *B60W 20/17* (2016.01); *B60W 20/20* (2013.01); *B60W 20/30* (2013.01); *F02B 63/04* (2013.01); *F02D 41/005* (2013.01); *F02D 41/0077* (2013.01); *F02D 41/0215* (2013.01); *B60K 6/365* (2013.01); *B60K 2006/381* (2013.01);
(Continued)

(58) Field of Classification Search
CPC .... B60W 20/17; B60W 50/082; B60W 20/13; B60W 20/20; B60W 20/30; B60K 6/445; Y02T 10/6239; F02D 41/0077
See application file for complete search history.

(56) References Cited

U.S. PATENT DOCUMENTS 5,967,940 A * 10/1999 Yamaguchi .............. B60K 6/24
477/107
6,575,865 B2    6/2003 Takenaka et al.
(Continued)

FOREIGN PATENT DOCUMENTS

JP    2002-120575 A    4/2002
JP    2006262585 A *   9/2006
(Continued)

*Primary Examiner* — Behrang Badii
*Assistant Examiner* — David A Testardi
(74) *Attorney, Agent, or Firm* — Hunton Andrews Kurth LLP

(57) ABSTRACT

A control device for a hybrid vehicle includes: an engine; an electric motor; a power distribution mechanism including an input element connected to the engine, an output element to transmit power toward an output shaft, and a reaction force element fixed selectively and non-rotatably and brings about a reaction force against power from the engine and to distribute power from the engine to the electric motor and the output shaft; a fixing unit selectively switching between an engaged state and a disengaged state; and a control unit to control a magnitude of torque output from the engine in the engaged state to be less than the magnitude of torque output from the engine in the disengaged state when an engine speed in the disengaged state is equivalent to that in the engaged state.

2 Claims, 8 Drawing Sheets

(51) Int. Cl.
- *B60W 20/30* (2016.01)
- *F02D 41/00* (2006.01)
- *B60W 20/13* (2016.01)
- *F02B 63/04* (2006.01)
- *F02D 41/02* (2006.01)
- *B60K 6/445* (2007.10)
- *B60K 6/48* (2007.10)
- *B60W 20/20* (2016.01)
- *B60K 6/365* (2007.10)
- *F02D 41/24* (2006.01)
- *B60K 6/38* (2007.10)

(52) U.S. Cl.
CPC ............ *B60W 2510/1005* (2013.01); *B60W 2510/244* (2013.01); *B60W 2710/06* (2013.01); *B60W 2710/0666* (2013.01); *B60Y 2200/92* (2013.01); *B60Y 2300/91* (2013.01); *B60Y 2400/73* (2013.01); *F02D 41/2422* (2013.01); *F02D 2200/101* (2013.01); *F02D 2200/1006* (2013.01); *F02D 2200/503* (2013.01); *F02D 2250/21* (2013.01); *Y02T 10/47* (2013.01); *Y02T 10/6221* (2013.01); *Y02T 10/6239* (2013.01); *Y02T 10/7258* (2013.01); *Y10S 903/91* (2013.01); *Y10S 903/93* (2013.01)

(56) References Cited

U.S. PATENT DOCUMENTS

| | | | | |
|---|---|---|---|---|
| 2003/0232678 | A1* | 12/2003 | Yamauchi | B60K 6/365 475/5 |
| 2009/0120700 | A1* | 5/2009 | Fukumura | B60K 6/365 180/65.265 |
| 2010/0023193 | A1* | 1/2010 | Ebuchi | B60K 6/365 701/22 |
| 2010/0023194 | A1* | 1/2010 | Okubo | B60W 20/10 701/22 |
| 2010/0032218 | A1* | 2/2010 | Ideshio | B60W 10/10 180/65.225 |
| 2010/0174431 | A1* | 7/2010 | Fukumura | B60W 40/12 701/22 |
| 2010/0274427 | A1* | 10/2010 | Ebuchi | B60K 6/445 701/22 |
| 2011/0054727 | A1* | 3/2011 | Ebuchi | B60W 20/10 701/22 |
| 2011/0231043 | A1* | 9/2011 | Ebuchi | B60K 6/365 701/22 |
| 2013/0073134 | A1* | 3/2013 | Yokouchi | B60K 6/365 701/22 |
| 2013/0282221 | A1* | 10/2013 | Harada | B60K 6/445 701/22 |
| 2014/0248991 | A1* | 9/2014 | Harada | B60K 6/445 477/3 |
| 2015/0031487 | A1* | 1/2015 | Kiyokami | B60K 6/365 475/5 |
| 2015/0057862 | A1* | 2/2015 | Sato | B60K 6/445 701/22 |
| 2015/0105205 | A1 | 4/2015 | Kurosaki et al. | |
| 2015/0158484 | A1* | 6/2015 | Sato | B60K 6/445 701/22 |
| 2015/0258976 | A1* | 9/2015 | Takahashi | B60K 6/445 701/22 |
| 2016/0250917 | A1 | 9/2016 | Shibata et al. | |

FOREIGN PATENT DOCUMENTS

| | | | | |
|---|---|---|---|---|
| JP | 2008174123 | A | * | 7/2008 |
| JP | 2009-208721 | A | | 9/2009 |
| JP | 2010100145 | A | * | 5/2010 ............ B60L 11/123 |
| JP | 2010234903 | A | * | 10/2010 ............ B60L 11/123 |
| JP | 2011201376 | A | | 10/2011 |
| JP | 2012056390 | A | * | 3/2012 |
| JP | 2012056421 | A | * | 3/2012 |
| JP | 2012091618 | A | * | 5/2012 |
| JP | 2012153167 | A | | 8/2012 |
| JP | 2012180090 | A | | 9/2012 |
| JP | 2015-077846 | A | | 4/2015 |

* cited by examiner

CONTROL DEVICE FOR HYBRID VEHICLE

CROSS-REFERENCE TO RELATED APPLICATION(S)

The present application claims priority to and incorporates by reference the entire contents of Japanese Patent Application No. 2016-192191 filed in Japan on Sep. 29, 2016.

BACKGROUND

The present disclosure relates to a control device for a hybrid vehicle.

Japanese Laid-open Patent Publication No. 2015-077846 discloses a hybrid vehicle (HV) switching between a THS mode and an overdrive lock mode (OD lock mode) as an HV traveling mode when power output from an engine is transmitted to driving wheels. In the THS mode, the vehicle travels as an electric motor generates a reaction force against the power of the engine. In the OD lock mode, a gear lock mechanism fixes a ring gear of a planetary gear mechanism so that a rotating speed of an output shaft is increased more than an engine speed and is transmitted to the driving wheels.

Japanese Laid-open Patent Publication No. 2002-120575 discloses an HV switching between a THS mode and an MG1 lock mode as an HV traveling mode when power output from an engine is transmitted to driving wheels. In the THS mode, the vehicle travels as a first electric motor generates a reaction force against the power of the engine. In the MG1 lock mode, an engagement device restricts a rotor shaft of the first electric motor from rotating.

SUMMARY

There is a need for partially solving the problems in the conventional technology.

A control device for a hybrid vehicle includes: an engine; an electric motor; a power distribution mechanism including an input element which is connected to the engine, an output element which transmits power toward an output shaft, and a reaction force element which is fixed selectively and non-rotatably and brings about a reaction force against power output from the engine, and distributing power from the engine to the electric motor and the output shaft; a fixing unit selectively switching between an engaged state in which the reaction force element is fixed non-rotatably and a disengaged state in which the reaction force element is rotatably disengaged; and a control unit controlling a magnitude of torque output from the engine in the engaged state to be less than the magnitude of torque output from the engine in the disengaged state when an engine speed in the disengaged state is equivalent to the engine speed in the engaged state.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Figure 1:
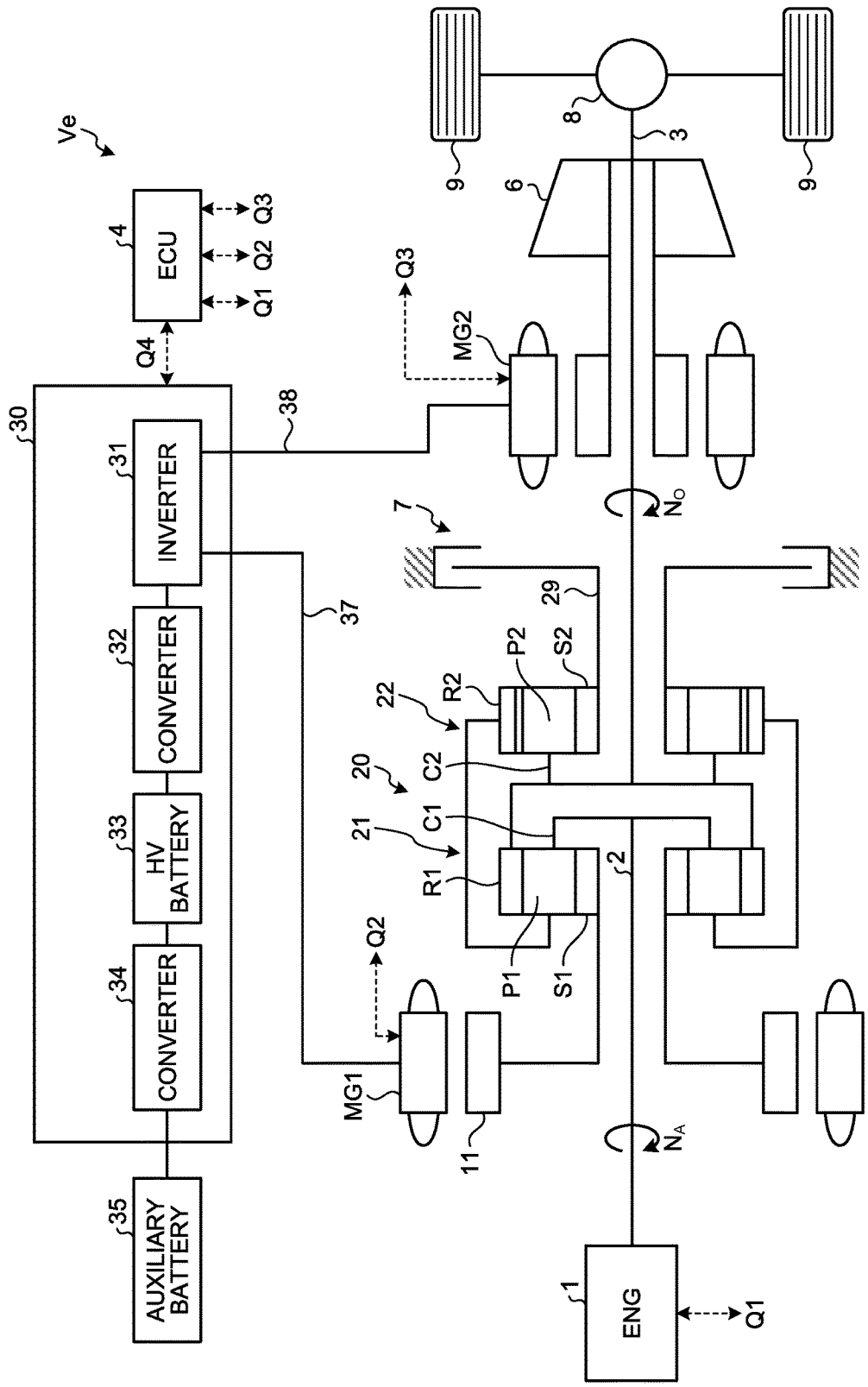
FIG. 1 is a skeleton diagram illustrating a configuration of a hybrid vehicle (HV) according to a first embodiment of the present disclosure.

While an HV is traveling in the THS mode, a gear rattle may occur in a transmission and the like due to fluctuations in engine speed. The following measures are conceivable to prevent the gear rattle. That is, an engine speed is increased so as to bring an engine to a mode with a low torque and a high engine speed, which reduces the fluctuations in rotating speeds of the engine.

However, in a case where a rotating speed of driving wheels is not changed while the HV travels in an overdrive lock mode (OD lock mode) or in an electric motor lock mode (MG1 lock mode), it is difficult to change the engine speed by an electric motor. For this reason, it is difficult to implement the aforementioned measures to reduce the fluctuations in rotating speeds of the engine.

Furthermore, while the HV is traveling in the OD lock mode or in the MG1 lock mode, a torque output from the electric motor is zero so that no torque is output from the electric motor toward the driving wheels. Therefore, in a power-transmission route from the engine to the electric motor, a backlash is easily generated in the electric motor of the transmission. In this state, when a rotating speed of the engine fluctuates, an abnormal noise such as a gear rattle and a muffled noise is likely to occur to close the backlash.

Furthermore, while the HV is traveling in the OD lock mode or in the MG1 lock mode, the vehicle travels with the backlash generated in the electric motor. Therefore, when the rotating speed of the engine fluctuates, an inertia torque against the fluctuations in engine speed is not output from the electric motor. In this case, the inertia torque of the electric motor is not transmitted to a drive system so that the drive system is easily twisted, which is prone to occur an abnormal noise such as a gear rattle and a muffled noise.

Hereinafter, embodiments of the present disclosure will be described with reference to the accompanied drawings. It should be noted that the same parts or corresponding parts are denoted by the same reference numerals throughout the drawings in the following embodiments. Furthermore, the present disclosure is not limited to the following embodiments.

First Embodiment

First, a hybrid vehicle according to a first embodiment of the present disclosure will be described. FIG. 1 illustrates a configuration of a hybrid vehicle (HV) according to the first embodiment of the present disclosure.

As illustrated in FIG. 1, a hybrid vehicle (HV) Ve according to the first embodiment is what is called a mechanical distribution twin-motor type hybrid vehicle. The HV Ve includes an engine 1, a first motor MG1 as an electric motor, a second motor MG2 as a second electric motor, all of which are power sources, and a power distribution mechanism 20.

The engine 1 is a heat engine such as a gasoline engine or a diesel engine that generates power by burning fuel. The engine 1 is connected to the power distribution mechanism 20. A torque is output from the engine 1 to an input shaft 2 of the power distribution mechanism 20 at an engine speed $N_A$ and is transmitted to the power distribution mechanism 20.

The first motor MG1 is connected to the input shaft 2 of the power distribution mechanism 20. The first motor MG1 is a generator that mainly generates electric power by rotating upon receiving the torque from the engine 1. A reaction force of the torque accompanies the generation of the electric power. By controlling a rotating speed of the first motor MG1, a rotating speed of the engine 1 changes continuously. The second motor MG2 is connected to an output shaft 3 through a second motor transmission unit 6. The second motor MG2 is a device which is for supporting (assisting) a driving torque or a braking force of the output shaft 3. When assisting the driving torque, the second motor MG2 receives electric power and works as an electric motor. When assisting the braking force, the second motor MG2 is rotated by a torque transmitted from driving wheels 9 and works as a generator that generates electric power. The output shaft 3 is connected to the driving wheels 9, involving a final reduction gear 8.

The first motor MG1 and the second motor MG2 are electrically connected to an auxiliary battery 35, via a power supply unit 30 including an inverter 31, converters 32, 34, and an HV battery 33. Accordingly, the second motor MG2 may be driven by the electric power generated by the first motor MG1.

The power distribution mechanism 20 is a mechanism for distributing an output torque of the engine 1 to the first motor MG1 and the output shaft 3, and generating a differential action. Specifically, the power distribution mechanism 20 is formed by combining two planetary gear mechanisms. A first planetary gear mechanism 21 includes a first ring gear R1; a first carrier C1 that connects a plurality of first pinion gears P1; and a first sun gear S1. A second planetary gear mechanism 22 is, for example, of a double-pinion type, including a second ring gear R2; a second carrier C2 that rotatably and revolvably holds a plurality of second pinion gears P2; and a second sun gear S2.

The engine 1 is connected to the first carrier C1 of the first planetary gear mechanism 21 via the input shaft 2. The first carrier C1 as an input element rotatably and revolvably holds the first pinion gears P1 that mesh with the first sun gear S1 and the first ring gear R1. The first carrier C1 is connected to the second ring gear R2 of the second planetary gear mechanism 22. A rotor 11 of the first motor MG1 is connected to the first sun gear S1 as a reaction force element of the first planetary gear mechanism 21.

The first ring gear R1 as an output element of the first planetary gear mechanism 21 and the second carrier C2 of the second planetary gear mechanism 22 are connected to each other and are connected to the output shaft 3. The second sun gear S2 of the second planetary gear mechanism 22 is connected to a rotation shaft 29. The rotation shaft 29 is fixable by a brake 7 as a fixing unit including an overdrive lock mechanism. In other words, the second sun gear S2 of the second planetary gear mechanism 22 is non-rotatably fixable by the brake 7. The brake 7 is, for example, a meshing mechanism including an engaging element provided with a plurality of dog teeth and an engaged element provided with a plurality of dog teeth (none of which are illustrated).

In a state where the second sun gear S2 is not fixed by the brake 7, by continuously changing the rotating speed of the first motor MG1 to continuously change the rotating speed of the engine 1, a Toyota Hybrid System (THS) mode is achieved. In a state where the second sun gear S2 is fixed by the brake 7, a transmission gear ratio determined by the power distribution mechanism 20 is fixed to a ratio in an overdrive state, which achieves an overdrive (OD) lock mode. The THS mode and the OD lock mode will be described below.

The first motor MG1 is connected to the inverter 31 by a power supply line 37. The second motor MG2 is connected to the inverter 31 by a power supply line 38. The inverter 31 is connected to the converter 32, and the converter 32 is connected to the HV battery 33. The HV battery 33 is connected to the auxiliary battery 35 through the converter 34.

The inverter 31 exchanges electric power between the first motor MG1 and the second motor MG2. At the time of regeneration, the inverter 31 converts the electric power generated by the first motor MG1 and the second motor MG2 by regeneration into DC power and supplies the DC power to the converter 32. The converter 32 converts the electric power supplied from the inverter 31 into a voltage and charges the HV battery 33. On the other hand, at the time of power running operation, the DC power output from the HV battery 33 is boosted by the converter 32 and supplied to the inverter 31, then the DC power is supplied to the first motor MG1 through the power supply line 37 or is supplied to the second motor MG2 through the power supply line 38. The electric power of the HV battery 33 is converted to a voltage by the converter 34 and supplied to the auxiliary battery 35 so as to be used for driving various auxiliary machines.

The operations of the inverter 31, the converter 32, the HV battery 33, and converter 34 are controlled by an ECU 4. The ECU 4 controls the operation of each element in the power supply unit 30 by transmitting a signal Q4. A necessary signal indicating a state and the like of each element in the power supply unit 30 is supplied to the ECU 4 as the signal Q4. Specifically, a state of charge (SOC) indicating an amount of charge in the HV battery 33, input and output limit values of the battery, and the like are supplied to the ECU 4 as the signal Q4.

Each unit of the HV Ve is controlled by the ECU 4 serving as a control unit included in a control device. The ECU 4 is physically an electronic circuit composed mainly of a well-known microcomputer including a central processing unit (CPU), a random access memory (RAM), a read only memory (ROM), an interface, and the like. The ECU 4 calculates with data input to the RAM, data stored in advance in the ROM, and the like, and outputs the calculation result as a command signal. Each function of the ECU 4 is achieved by loading a program stored in the ROM into the RAM and executing the program by the CPU so as to operate various devices inside the HV Ve under control of the CPU, to read data in the RAM or ROM as a recording unit, and to write data in the RAM.

Specifically, the ECU 4 controls the engine 1 by transmitting and receiving a signal Q1 to and from the engine 1. The ECU 4 controls the first motor MG1 by transmitting and receiving a signal Q2 to and from the first motor MG1. The ECU 4 controls the second motor MG2 by transmitting and receiving a signal Q3 to and from the second motor MG2. For example, the ECU 4 detects an accelerator position angle based on a signal from an accelerator pedal (not illustrated) so as to calculate required driving torque, and controls the engine 1, first motor MG1, and second motor MG2 so that the driving torque reaches the calculated required driving torque. The ECU 4 also supplies a signal to a brake operating unit (not illustrated). The brake operating unit can selectively switch between an engaged state and a disengaged state in the brake 7 based on the supplied signal.

The HV Ve according to the first embodiment has an EV traveling mode and an HV traveling mode. In the EV traveling mode, the vehicle travels by using the second motor MG2 as a power source. The EV traveling mode is selected under traveling conditions such as a relatively low vehicle speed, and low load. In the HV traveling mode, the vehicle travels by using the engine 1 as a power source. In the HV traveling mode, the second motor MG2 can also be used as a power source. The HV traveling mode has two traveling modes, which are the THS mode and OD lock mode.

In the THS mode, the vehicle travels as the first motor MG1 generates a reaction force against power of the engine 1. The THS mode is achieved by the differential action of the power distribution mechanism 20. In other words, in the THS mode, the vehicle travels with the brake 7 in the disengaged state so that the second sun gear S2 is allowed to rotate. At this time, the first motor MG1 outputs reaction torque against the engine torque output from the engine 1 and works as a reaction force receiving mechanism. In the THS mode, the rotating speed of the first motor MG1 is changed so that the power distribution mechanism 20 works as a continuously variable transmission unit, and the transmission gear ratio may be varied steplessly. The THS traveling mode is also called a continuously variable transmission mode or a CVT control mode.

In the OD lock mode, by restricting the rotation of the second sun gear S2 serving as the reaction force element in the power distribution mechanism 20, the rotation of the engine 1 is sped up and output from the first ring gear R1 of the first planetary gear mechanism 21 to the output shaft 3. As the second sun gear S2 is fixed, the transmission gear ratio of the power distribution mechanism 20 is fixed to a predetermined transmission gear ratio. The OD lock mode may also be called a "fixed transmission mode".

The brake 7 is a brake mechanism for switching between, for example, the THS mode and the OD lock mode in the HV traveling mode by regulating or allowing the rotation of the second sun gear S2 of the second planetary gear mechanism 22.

Controlling Process of HV

Figure 2:
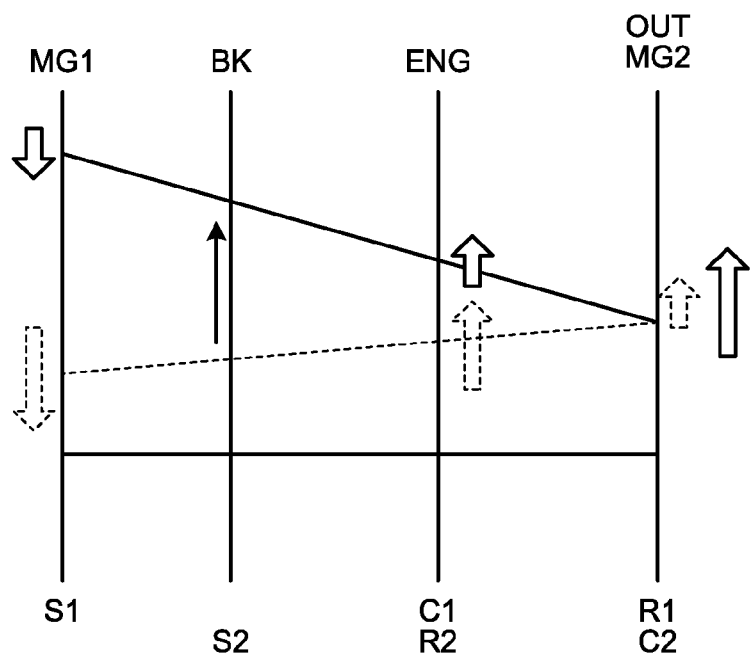
FIG. 2 is an example of a nomograph of the HV according to the first embodiment in a THS mode.
Figure 3:
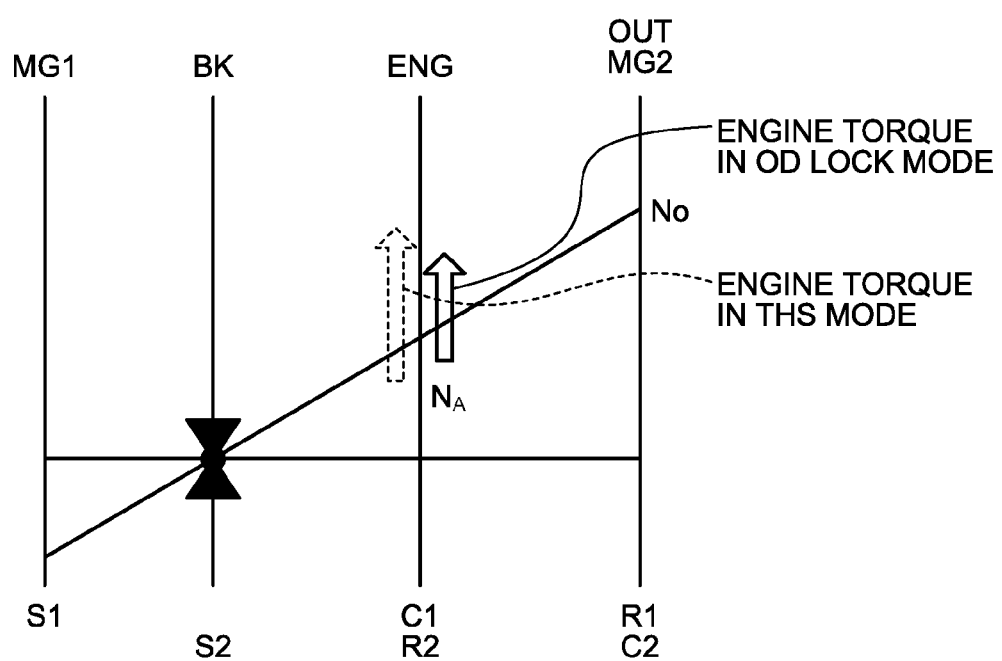
FIG. 3 is another example of a nomograph of the HV according to the first embodiment in an OD lock mode.

Hereinafter described is a controlling process of the control device of the HV Ve according to the first embodiment as described above. FIGS. 2 and 3 illustrate examples of nomographs in the THS mode and that in the OD lock mode, respectively, in the HV Ve according to the first embodiment. In the nomograph of FIG. 2 and in the subsequent drawings, the vertical direction corresponds to the rotating speed, the upward direction corresponds to a positive rotation, the symbols MG1 and MG2 denote the first motor MG1 and second motor MG2, respectively, the symbol ENG denotes the engine 1, the symbol BK denotes the brake 7, and the symbol OUT denotes the output shaft 3.

In the HV Ve illustrated in FIG. 1, while the vehicle is traveling in the THS mode, a gear rattle or a muffled noise may occur, for example, at portions inside the power distribution mechanism 20 where the gears are used, due to the fluctuations in rotating speeds of the engine 1. Therefore, as illustrated in FIG. 2, in a case where a rotating speed $N_O$ of the output shaft 3 is equivalent to a rotating speed of the engine 1, the ECU 4 controls the rotating speed of the engine 1 to a state indicated by the solid line in FIG. 2 which is greater than a state indicated by the broken line. In this case, the output torque of the engine 1 changes from a state indicated by a dotted arrow to a state indicated by a solid arrow as illustrated in a part in the nomograph of FIG. 2 corresponding to the engine 1 (ENG). At the same time, torque of the first motor MG1 changes from a state indicated by a dotted arrow to a state indicated by a solid arrow as illustrated in a part corresponding to MG1. Accordingly, it is possible to prevent the occurrence of a gear rattle or a muffled noise compared to a case where the state is indicated by the broken line in the nomograph.

Furthermore, as illustrated in FIG. 3, in the OD lock mode, the second sun gear S2 is fixed by the brake 7. Accordingly, in the OD lock mode, the vehicle comes to the overdrive state where the rotating speed $N_O$ of the output shaft 3 (OUT) is greater than the engine speed $N_A$ of the engine 1 (ENG). In this case, the second sun gear S2 is fixed by the brake 7 so that the brake 7 works as a reaction force receiving mechanism that supports reaction torque corresponding to the output torque of the engine 1, and the power distribution mechanism 20 works as a speed-up gear. Accordingly, there is no need to make the first motor MG1 work as a generator or an electric motor so that the first motor MG1 is substantially in an idle state. Therefore, there is no need to supply electric power from the second motor MG2 to the first motor MG1, which avoids circulation of power. Thus, in steady traveling at high speed, switching from the THS mode to the OD lock mode when traveling with the engine avoids the circulation of power and to enhance fuel efficiency.

However, when the HV Ve is traveling in the OD lock mode, the second sun gear S2 is fixed by the brake 7 so that it is difficult to change the rotating speed of the engine 1 by the first motor MG1 without changing the rotating speed of the output shaft 3. Furthermore, the output torque of the first motor MG1 connected to the power distribution mechanism 20 is zero. Therefore, unlike a case where the vehicle travels in a state where the OD lock mode is canceled, for example, in the THS mode, when the vehicle is traveling in the OD lock mode, backlash in the first motor MG1 is not closed so that the gear rattle or muffled noise is likely to occur accompanying the fluctuations in rotating speeds of the engine 1. While traveling in the OD lock mode, the HV Ve travels with the backlash not closed in the first motor MG1 of the power distribution mechanism 20. Therefore, with the fluctuations in rotating speeds of the engine 1, an inertia torque against the fluctuations in rotating speeds is not output from the first motor MG1 which is to be rotated by the rotation of the engine 1. In this case, the inertia torque of the first motor MG1 is not transmitted to a drive system so that the drive system is easily twisted, which is more prone to occur abnormal noise such as a gear rattle and a muffled noise.

Figure 4:
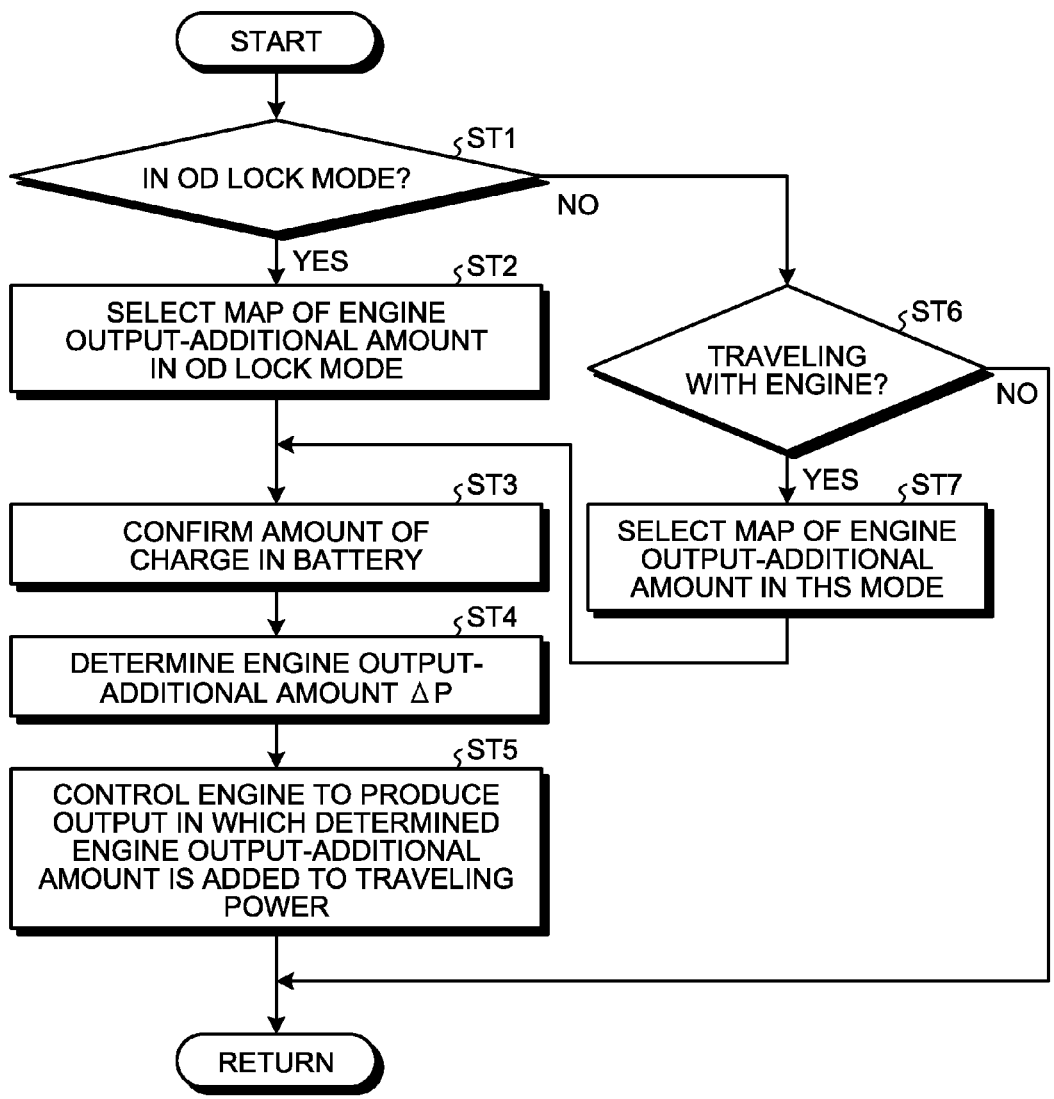
FIG. 4 is a flowchart illustrating a controlling process of an engine output in the HV according to the first embodiment.

Therefore, under the condition that the engine speed is equivalent, the ECU 4 in the first embodiment controls the output torque of the engine 1 when traveling in the OD lock mode (the solid arrow in FIG. 3) to be less than the output torque of the engine 1 when traveling in the THS mode (the broken line arrow in FIG. 3). Note that the THS mode is an example in which the vehicle travels with the engine and with the OD lock mode canceled. This controlling process will hereinafter be described specifically. FIG. 4 is a flowchart illustrating the controlling process of the output torque of the engine 1 in the HV Ve according to the first embodiment. The controlling process illustrated in the flowchart of FIG. 4 is repeatedly executed by the ECU 4 at a predetermined interval while the HV Ve is traveling.

In other words, as illustrated in FIG. 4, in step ST1, the ECU 4 determines whether a traveling mode of the HV Ve is the OD lock mode. When the ECU 4 determines that the traveling mode is the OD lock mode (step ST1: Yes), the process proceeds to step ST2. In step ST2, the ECU 4 selects an additional amount to output with respect to the engine 1.

The additional amount to the output of the engine 1 will be described. In other words, the additional amount to the output of the engine 1 is output power, among the power output from the engine 1, other than traveling power consumed by the driving wheels 9. Herein, the output power of the engine 1 other than the traveling power is referred to as an "engine output-additional amount". The engine output-additional amount is used for various power other than the traveling power, specifically, for example, workloads when making the first motor MG1 generate. Under the condition that the rotating speed of the engine 1 is equivalent, the ECU 4 controls the output torque of the engine 1 by increasing/decreasing the engine output-additional amount and increasing/decreasing the output of the engine 1.

Figure 5:
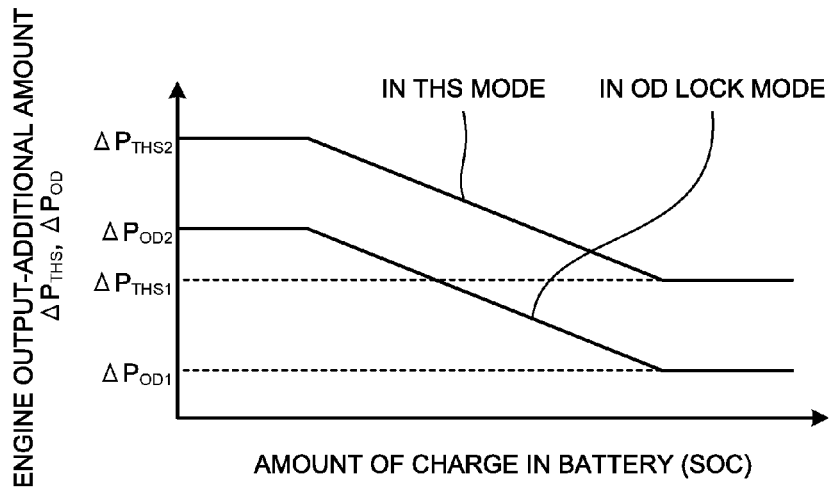
FIG. 5 is a map illustrating an engine output-additional amount in accordance with an amount of charge in a battery in the HV according to the first embodiment.

FIG. 5 is a map illustrating the engine output-additional amount in accordance with the amount of charge in the battery in the HV Ve. As illustrated in FIG. 5, with an increase in the amount of charge (state of charge: SOC) in the HV battery 33, an engine output-additional amount $\Delta P_{OD}$ in the OD lock mode is set to decrease monotonically from a state where it is steady at a predetermined upper limit ($\Delta P_{OD2}$) to a state where it is steady at a predetermined lower limit ($\Delta P_{OD1}$). Similarly, with an increase in the SOC of the HV battery 33, an engine output-additional amount $\Delta P_{THS}$ in the THS mode is set to decrease monotonically from a state where it is steady at a predetermined upper limit ($\Delta P_{THS2}$) to a state where it is steady at a predetermined lower limit ($\Delta P_{THS1}$). This is because the need for increasing the SOC is higher when the SOC is small, and the need for increasing a power generation amount of the first motor MG1 by the output of the engine 1 is higher in order to charge the battery. On the other hand, when the SOC is large, sufficient electric power is secured in the HV battery 33 so that the need for increasing the SOC is reduced and the need for decreasing the power generation amount of the first motor MG1 is increased.

In the first embodiment, in any SOC, the engine output-additional amount $\Delta P_{OD}$ in the OD lock mode is set to be less than the engine output-additional amount $\Delta P_{THS}$ in the THS mode ($\Delta P_{OD} < \Delta P_{THS}$). Accordingly, regardless of the SOC, the output torque of the engine 1 in the OD lock mode is less than the output torque of the engine 1 in the THS mode in a case where the engine speed is equivalent in the OD lock mode and in the THS mode. The map of the engine output-additional amount illustrated in FIG. 5 is readably stored in the recording unit of the ECU 4.

In step ST2 of FIG. 4, the ECU 4 selects a map of the engine output-additional amount $\Delta P_{OD}$ in the OD lock mode from the map illustrated in FIG. 5 stored in the recording unit. In step ST3, the ECU 4 confirms the SOC based on the signal Q4 from the HV battery 33. Subsequently, in step ST4, the ECU 4 uniquely determines the engine output-additional amount $\Delta P_{OD}$ based on the map of the selected engine output-additional amount $\Delta P_{OD}$ illustrated in FIG. 5 and the confirmed SOC. Thereafter, the process proceeds to step ST5.

In step ST5, the ECU 4 controls the engine 1 to produce output in which the uniquely determined engine output-additional amount $\Delta P_{OD}$ is added to the traveling power. Accordingly, the output of the engine 1 is increased by the determined engine output-additional amount $\Delta P_{OD}$. In such a manner, the controlling process according to the first embodiment is completed.

In step ST1, when the ECU 4 determines that the traveling mode of the HV Ve is not the OD lock mode (step ST1: No), the process proceeds to step ST6. In step ST6, the ECU 4 determines whether the HV Ve is traveling with the engine, that is, whether the HV Ve is in the THS mode. When the ECU 4 determines that the HV Ve is not traveling with the engine, more specifically, for example, when the ECU 4 determines that the HV Ve is in the EV traveling mode (step ST6: No), the ECU 4 ends the controlling process according to the first embodiment.

On the other hand, when the ECU 4 determines in step ST6 that the HV Ve is traveling with the engine (step ST6: Yes), the process proceeds to step ST7. In step ST7, the ECU 4 selects an additional amount in the THS mode as the additional amount to the output with respect to the engine 1. In other words, the ECU 4 selects the map of the engine output-additional amount $\Delta P_{THS}$ in the THS mode illustrated in FIG. 5. Thereafter, the process proceeds to step ST3.

After proceeding to step ST3, the ECU 4 confirms the SOC and then proceeds to step ST4 to determine the engine output-additional amount $\Delta P_{THS}$ based on the map of the selected engine output-additional amount $\Delta P_{THS}$ and the confirmed SOC. In step ST5, the ECU 4 controls the output of the engine 1 to turn into output based on the determined engine output-additional amount $\Delta P_{THS}$. With this control, the rotating speed of the engine 1 is also increased. In such a manner, the controlling process according to the first embodiment is completed.

Figure 6:
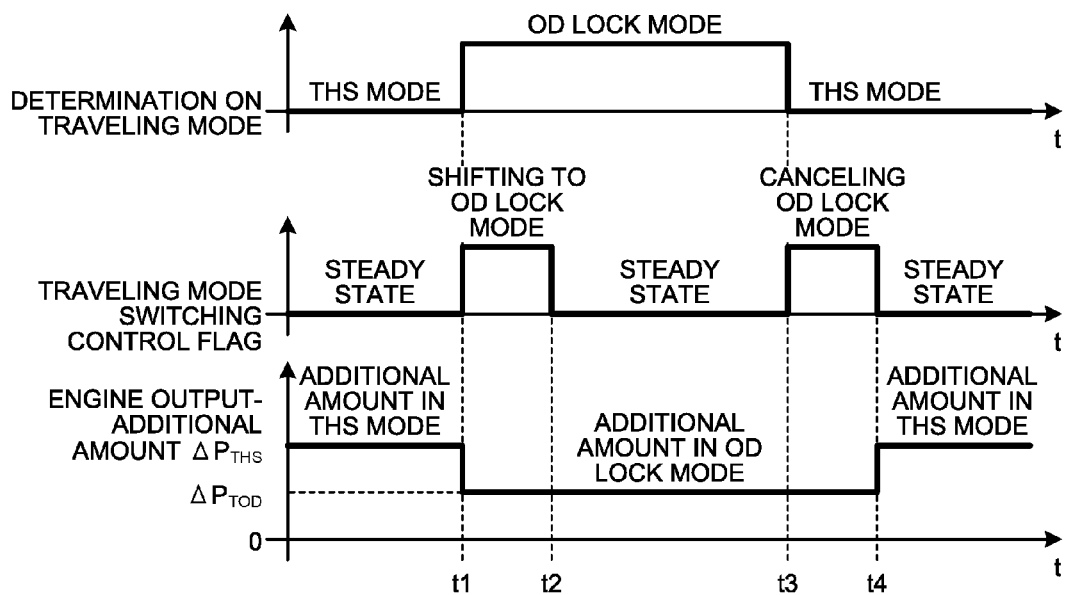
FIG. 6 is a timing chart illustrating a controlling process of the engine output-additional amount in the HV according to the first embodiment.

Hereinafter described is a timing in which the engine output-additional amount is switched, which is within the controlling process according to the first embodiment described above. FIG. 6 is a timing chart illustrating the controlling process of switching the engine output-additional amount in the HV Ve according to the first embodiment.

As illustrated in FIG. 6, it is assumed that the ECU 4 determines to switch the traveling mode from the THS mode to the OD lock mode, and returns to the THS mode. In other words, at time t1, the ECU 4 determines that it is necessary to shift the traveling mode of the HV Ve from the THS mode to the OD lock mode. In this case, a flag (traveling mode switching control flag) for switching the traveling mode is set to be on by the ECU 4.

Thereafter, at time t2 when the shifting from the THS mode to the OD lock mode is completed, the traveling mode switching control flag is set to be off by the ECU 4. After this time t2, the traveling mode of the HV Ve is in the steady state of the OD lock mode, and the HV Ve travels in the OD lock mode. Thereafter, when the ECU 4 determines that it is necessary to shift the traveling mode of the HV Ve from the OD lock mode to the THS mode at time t3, the traveling mode switching control flag is set to be on by the ECU 4.

At time t4 when the shifting from the OD lock mode to the THS mode is completed, the traveling mode switching control flag is set to be off by the ECU 4. After this time t4, the traveling mode of the HV Ve is in the steady state of the THS mode, and the HV Ve travels in the THS mode.

As described above, in a case where the traveling mode of the HV Ve returns to the THS mode after switching from the THS mode to the OD lock mode, the timing of switching the engine output-additional amount is preferably the time t1 and the time t4.

In other words, at the time t1 when the shifting from the THS mode to the OD lock mode is started, the engine output-additional amount $\Delta P$ is switched from the engine output-additional amount $\Delta P_{THS}$ in the THS mode to the engine output-additional amount $\Delta P_{OD}$ in the OD lock mode. When shifting from the THS mode to the OD lock mode, the rotating speed of the engine 1 changes. As the engine output-additional amount $\Delta P$ with respect to the engine 1 is reduced before changing the rotating speed, it is possible to prevent a gear rattle or a muffled noise during the shifting to the OD lock mode.

At the time t4 when the shifting from the OD lock mode to the THS mode is completed, the engine output-additional amount $\Delta P$ is switched from the engine output-additional amount $\Delta P_{OD}$ in the OD lock mode to the engine output-additional amount $\Delta P_{THS}$ in the THS mode. When shifting from the OD lock mode to the THS mode, the rotating speed of the engine 1 changes. As the engine output-additional amount $\Delta P$ with respect to the engine 1 is reduced until the change of the rotating speed is completed, it is possible to prevent a gear rattle or a muffled noise during the shifting to the THS mode.

According to the first embodiment of the present disclosure described above, when the engine speed in the engine 1 is equivalent, the engine output-additional amount $\Delta P_{OD}$ in the OD lock mode is set to be less than the engine output-additional amount $\Delta P_{THS}$ in the mode in which the OD lock mode is canceled (THS mode), and the output torque of the engine 1 in the OD lock mode is set to be less than the output torque of the engine 1 in the THS mode. Therefore, it is possible to prevent the occurrence of abnormal noise such as a gear rattle and a muffled noise.

Second Embodiment

Figure 7:
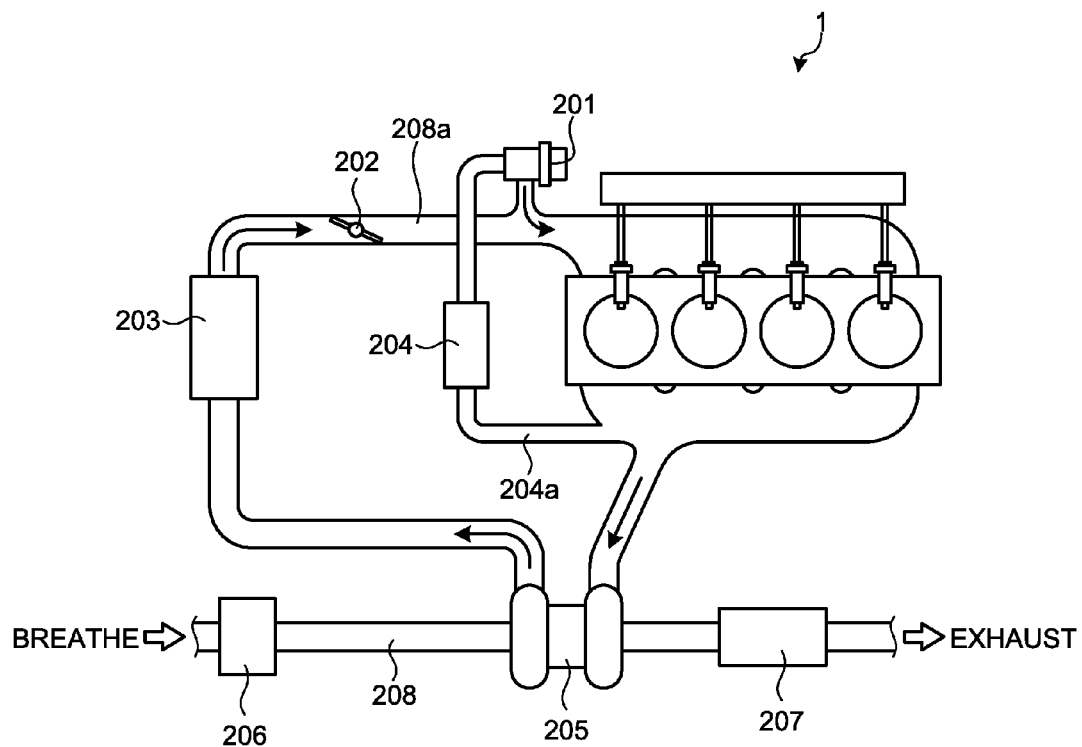
FIG. 7 is a schematic view illustrating an example of a configuration of an engine in an HV according to a second embodiment.

Hereinafter described is a process of controlling an HV Ve according to a second embodiment of the present disclosure. FIG. 7 is a schematic diagram illustrating an example of a configuration of an engine 1 in the HV Ve according to the second embodiment. As illustrated in FIG. 7, in the engine 1, an air flow meter 206 and a throttle valve 202 for adjusting an air intake quantity are provided to an intake channel 208 disposed close to a part that breathes air. The engine 1 includes a supercharger 205 that rotates a turbine with discharge pressure so as to drive a coaxial compressor and to increase the air intake quantity, thereby assisting engine torque. A part of the intake channel 208, disposed between the supercharger 205 and an intake manifold 208a is provided with an intercooler 203 that cools supercharged air whose temperature has been raised. A catalyst device 207 having a $NO_x$ catalyst for purifying particulate matter in exhaust air and $NO_x$ is disposed close to a part in the engine 1 that exhausts air. A temperature sensor (not illustrated) for detecting a temperature of the $NO_x$ catalyst is provided in the catalyst device 207. The engine 1 is further provided with an exhaust gas recirculation system (EGR) that returns part of the exhaust gas to an intake system. In an EGR channel 204a of the EGR system, an EGR cooler 204 and an EGR valve 201 are sequentially disposed toward a side close to the intake manifold 208a. Being controlled by an ECU 4 (not illustrated in FIG. 7), the EGR system is switchable between start and stop.

Figure 8:
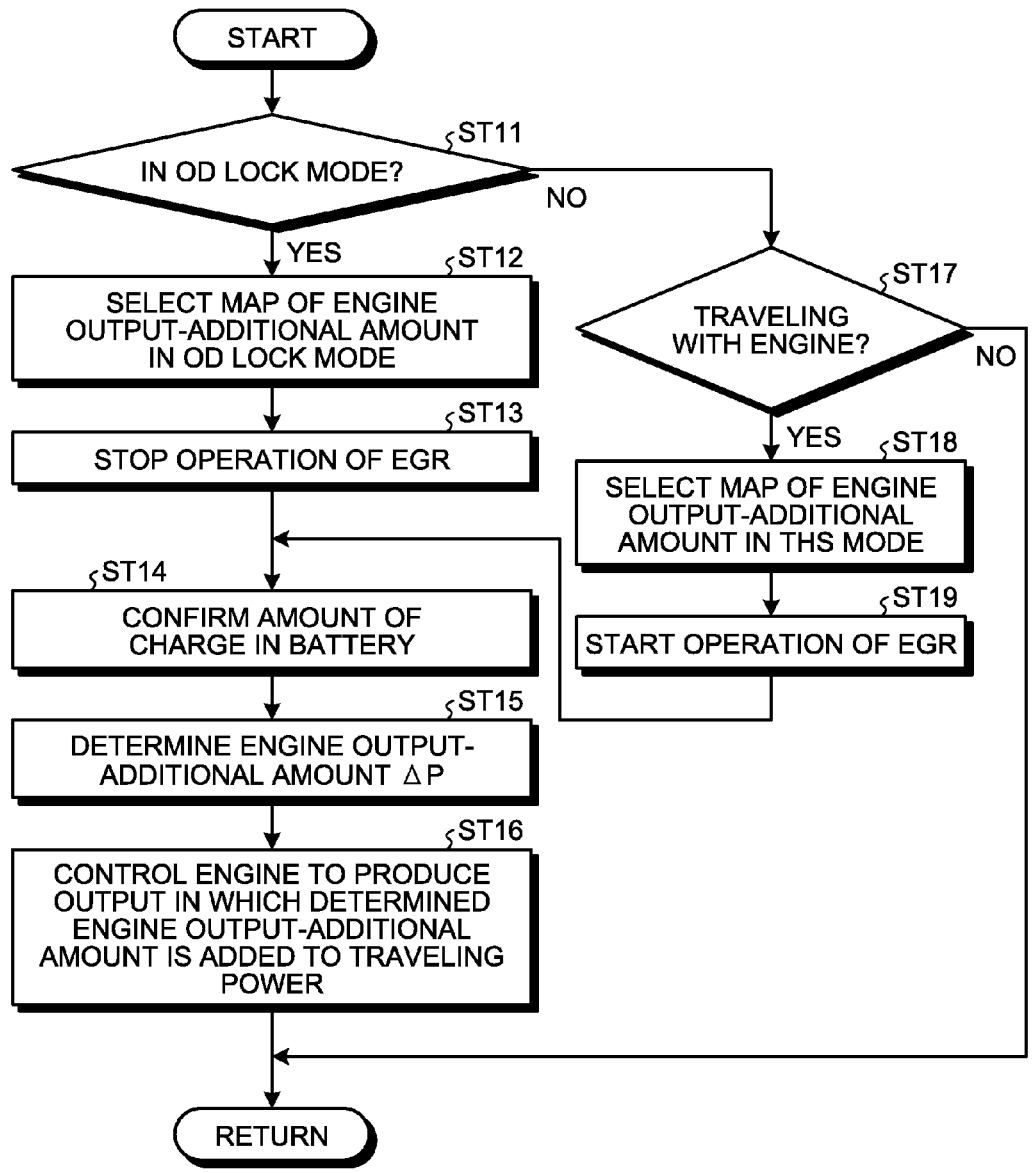
FIG. 8 is a flowchart illustrating a controlling process of the HV according to the second embodiment.

Hereinafter described is a controlling process which is carried out by a control device of the HV Ve according to the second embodiment. FIG. 8 is a flowchart illustrating the controlling process of the HV Ve according to the second embodiment. It should be noted that the flowchart illustrated in FIG. 8 is repeatedly executed at a predetermined interval by the ECU 4 while the HV Ve travels.

As illustrated in FIG. 8, in step ST11, the ECU 4 determines whether a traveling mode of the HV Ve is the OD lock mode. When it is determined that the ECU 4 is in the OD lock mode (step ST11: Yes), the process proceeds to step ST12.

In step ST12, the ECU 4 selects a map of an engine output-additional amount $\Delta P_{OD}$ in the OD lock mode as an additional amount to output with respect to the engine 1. Thereafter, the process proceeds to step ST13. In step ST13, the ECU 4 stops the operation of the EGR system. Steps ST14 to ST16 are similar to steps ST3 to ST5 in the first embodiment, respectively, and the description thereof are omitted. In such a manner, the process to control the output of the engine 1 according to the second embodiment is completed.

On the other hand, when the ECU 4 determines in step ST11 that the HV Ve is not in the OD lock mode (step ST11: No), the process proceeds to step ST17, in which the ECU 4 determines whether the HV Ve is traveling with the engine, that is, whether the HV Ve is in the THS mode. When the ECU 4 determines that the HV Ve is not traveling with the engine, more specifically, for example, when the ECU 4 determines that the HV Ve is in the EV traveling mode (step ST17: No), the ECU 4 ends the controlling process of the output of the engine 1 according to the second embodiment.

In step ST17, when the ECU 4 determines that the HV Ve is traveling with the engine and is in the THS mode (step ST17: Yes), the process proceeds to step ST18. In step ST18, the ECU 4 selects a map of an engine output-additional amount $\Delta P_{THS}$ in the THS mode as the map of the engine output-additional amount. Thereafter, the process proceeds to step ST19. In step ST19, the ECU 4 starts the operation of the EGR system. Thereafter, the ECU 4 sequentially executes the aforementioned steps ST14 to ST16. In such a manner, the process to control the output with respect to the engine 1 according to the second embodiment is completed.

In the second embodiment, the engine output-additional amount $\Delta P_{OD}$ in the OD lock mode is made less than the engine output-additional amount $\Delta P_{THS}$ in the THS mode when a rotating speed in the engine 1 is equivalent so that it is possible to obtain effects similar to those obtained in the first embodiment. Furthermore, when using the EGR system, intake temperatures and unburned gas are likely to vary so that the rotating speed of the engine 1 tends to fluctuate. However, in the second embodiment, it is possible to regulate the fluctuations in rotating speeds of the engine 1 by stopping the operation of the EGR system when the traveling mode of the HV Ve is the OD lock mode. Therefore, it is possible to prevent the occurrence of abnormal sounds such as a gear rattle and a muffled noise generated with the fluctuations in rotating speeds.

Third Embodiment

Figure 9:
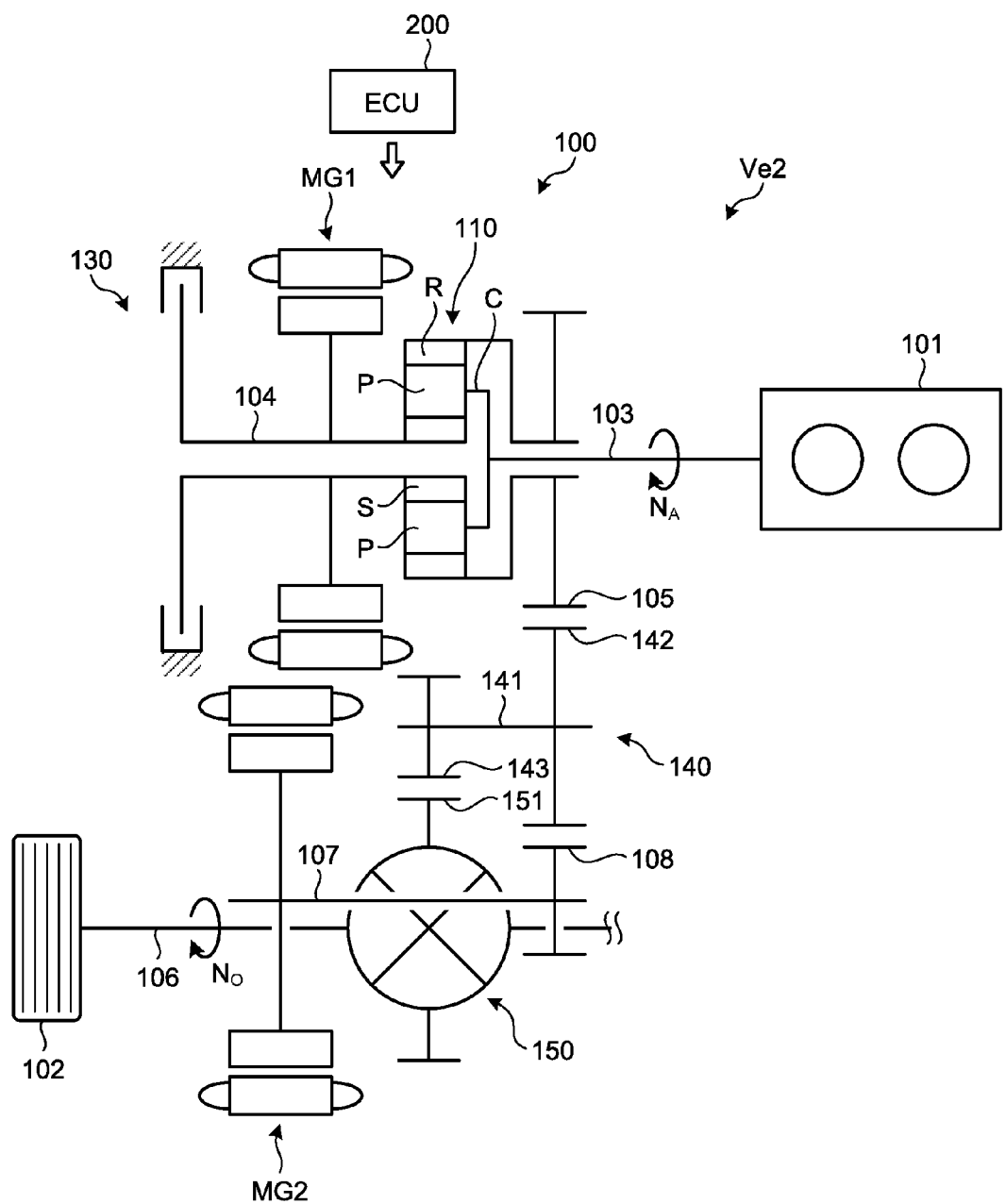
FIG. 9 is a skeleton diagram illustrating a configuration of an HV according to a third embodiment.

A control device for a vehicle according to a third embodiment of the present disclosure will be described below. FIG. 9 is a skeleton diagram illustrating a configuration of a hybrid vehicle according to the third embodiment of the present disclosure.

As illustrated in FIG. 9, an HV Ve2 is a double-shaft, twin-motor hybrid vehicle including an engine 101, a first motor MG1, and a second motor MG2. A powertrain 100 of the HV Ve2 includes a planetary gear mechanism 110, a brake 130, a counter gear mechanism 140, and a differential gear mechanism 150. The engine 101, the planetary gear mechanism 110, and the brake 130 are similar to the engine 1, the first planetary gear mechanism 21, and the brake 7 in the first embodiment, respectively.

In the HV Ve2, the power output from the engine 101 is divided to be used for the first motor MG1 and driving wheels 102 by the planetary gear mechanism 110 serving as a power distribution mechanism. When an engine torque is transmitted to the driving wheels 102, the brake 130 serving as a fixing unit including an electric motor lock mechanism works as a reaction force receiving mechanism for supporting an engine reaction force so that the planetary gear mechanism 110 works as a speed-up gear or a transmission unit. Due to the mechanical power divided to be used for the first motor MG1, the first motor MG1 works as a generator so as to charge a battery with electric power generated in the first motor MG1 and to supply the electric power to the second motor MG2 through an inverter (the battery and the inverter are not illustrated). Using the electric power generated in the first motor MG1, the second motor MG2 can also work as a motor.

A crankshaft of the engine 101 is connected to an output shaft 103. The output shaft 103 is connected to the planetary gear mechanism 110. The engine 101 outputs a torque to the output shaft 103 at an engine speed $N_A$. In the powertrain 100, the planetary gear mechanism 110, the first motor MG1, and the brake 130 are disposed coaxially with the output shaft 103. The second motor MG2 is disposed on an axis different from a central axis of rotation of the engine 101.

In the HV Ve2, a rotor shaft 104 of the first motor MG1 is coupled to a sun gear S of the planetary gear mechanism 110 so as to rotate in an integrated manner. To a carrier C connected with a plurality of pinion gears P, the output shaft 103 is connected so as to rotate in an integrated manner, and the engine 101 is connected with the output shaft 103 involved. A ring gear R is formed in an integrated manner with an output gear 105 of an external gear that transmits the engine torque from the planetary gear mechanism 110 to the driving wheels 102.

The output gear 105 meshes with a counter driven gear 142. The output gear 105 is connected to the differential gear mechanism 150 through the counter gear mechanism 140 including the counter driven gear 142. The counter gear mechanism 140 includes a counter shaft 141 disposed in parallel with the output shaft 103; the counter driven gear 142 meshed with the output gear 105; and a counter drive gear 143 meshed with a ring gear 151 of the differential gear mechanism 150. The counter driven gear 142 and counter drive gear 143 are attached to the counter shaft 141 rotatably in an integrated manner. The driving wheels 102 are connected to the differential gear mechanism 150 through a drive shaft 106 serving as a right-and-left output shaft.

In the HV Ve2, the torque output from the second motor MG2 may be added to the torque transmitted from the engine 101 to the driving wheels 102. The second motor MG2 includes a rotor shaft 107 that rotates with a rotor in an integrated manner. The rotor shaft 107 of the second motor MG2 is disposed in parallel with the counter shaft 141. Furthermore, a reduction gear 108 meshed with the counter driven gear 142 is attached to the rotor shaft 107 so as to rotate in an integrated manner.

The HV Ve2 according to the third embodiment has an HV traveling mode and an EV traveling mode. The HV traveling mode has two traveling modes, which are a THS mode and an MG1 lock mode. The brake 130 is a brake mechanism for switching between, for example, the THS mode and the MG1 lock mode in the HV traveling mode by regulating or allowing the rotation of a rotation element (sun gear S) of the planetary gear mechanism 110.

In the THS mode, the vehicle travels with the brake 130 in a disengaged state so that the sun gear S is allowed to rotate. An ECU 200 makes the first motor MG1 output reaction torque against the engine torque and makes it work as a reaction force receiving mechanism. The engine torque is transmitted from the ring gear R to the driving wheels 102 through the counter gear mechanism 140 and the drive shaft 106, and generates driving force for driving the HV Ve2. Furthermore, the ECU 200 supplies a signal to a brake operating unit (not illustrated). The brake operating unit can selectively switch between an engaged state and the disengaged state in the brake 130 based on the supplied signal.

In the MG1 lock mode, the vehicle travels with the brake 130 in the engaged state. In the MG1 lock mode, the HV Ve2 travels in an overdrive state in which the rotation of the engine 101 is sped up as the brake 130 regulates the rotation of the sun gear S as a reaction force element in the planetary gear mechanism 110.

Each part of the HV Ve2 is controlled by the ECU 200 as a control unit included in the control device. The ECU 200 is an electronic circuit similar to the ECU 4 according to the first embodiment. In other words, the ECU 200 is input with detection signals indicating such as the vehicle speed, the accelerator position angle, the engine speed, an estimated output torque, rotating speeds of the first motor MG1 and the second motor MG2, torque, and an operation state of the brake 130. On the other hand, from the ECU 200, the engine speed of the engine 101, command signals for controlling the first motor MG1, the second motor MG2, and the brake 130 are output in accordance with calculation results based on the input data.

Figure 10:
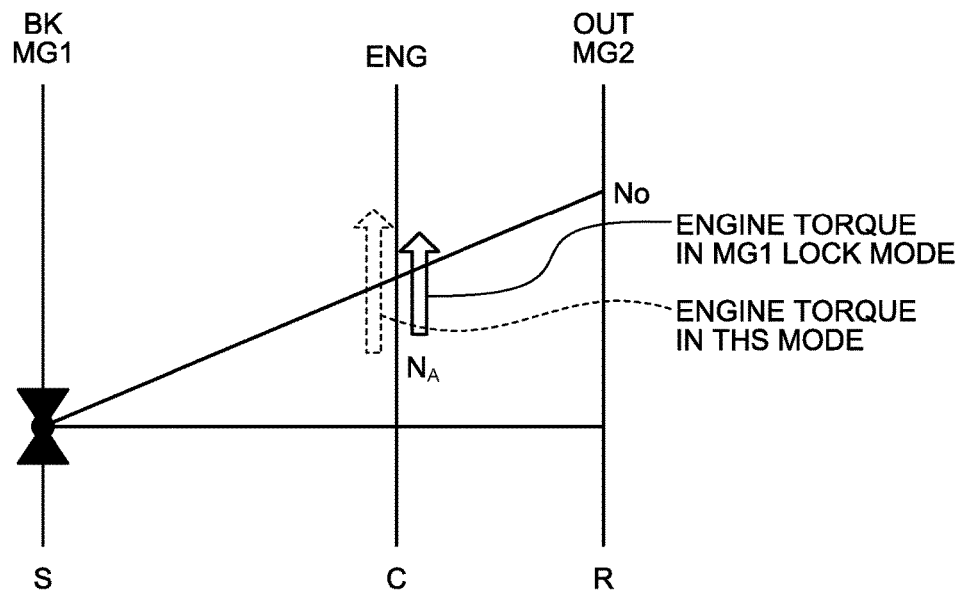
FIG. 10 is an example of a nomograph of the HV according to the third embodiment in an MG1 lock mode.

Hereinafter described is a controlling process in the HV Ve2 according to the third embodiment as described above. FIG. 10 is an example of a nomograph in the MG1 lock mode in the HV Ve2 according to the third embodiment.

As illustrated in FIG. 10, in the third embodiment, the sun gear S is fixed by the brake 130 when the vehicle is in the MG1 lock mode. Accordingly, as illustrated by the solid line in FIG. 10, in the MG1 lock mode, the vehicle becomes in the overdrive state where a rotating speed $N_O$ of the output shaft 103 (OUT) is greater than an engine speed $N_A$ of the engine 101 (ENG). In this case, the sun gear S is fixed by the brake 130 so that the brake 130 works as a reaction force receiving mechanism that supports reaction torque corresponding to the output torque of the engine 101, and the planetary gear mechanism 110 as the power distribution mechanism works as a speed-up gear. Accordingly, there is no need to make the first motor MG1 work as a generator or an electric motor and there is no need to supply the electric power from the second motor MG2 to the first motor MG1, thereby avoiding circulation of power. Thus, in steady traveling at high speed, it is possible to enhance fuel efficiency by switching from the THS traveling mode to the MG1 lock traveling mode.

In the third embodiment, a controlling process similar to the case of the OD lock mode in the first embodiment is carried out. In other words, under the condition that the rotating speed of the engine 101 is equivalent, the ECU 200 controls the output torque from the engine 101 in the MG1 lock mode to be less than the output torque from the engine 101 in the THS mode. This makes it possible to prevent a gear rattle or a muffled noise in the planetary gear mechanism 110.

Although an embodiment of the present disclosure has been specifically described, the present disclosure is not limited to the aforementioned embodiment and can be variously modified based on the technical idea of the present disclosure. For example, the numerical values mentioned in the above embodiment are merely examples, and different numerical values may be used as necessary.

Figure 11:
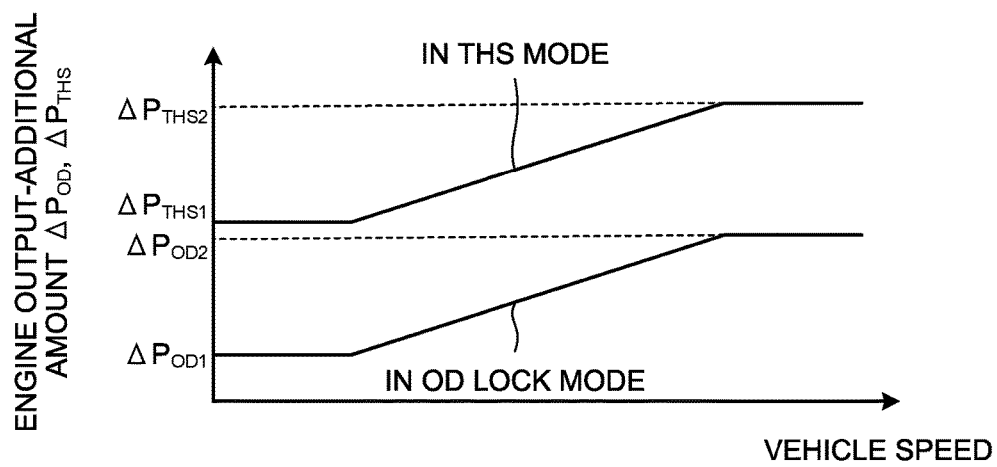
FIG. 11 is a map illustrating an engine output-additional amount in accordance with a vehicle speed in an HV according to a modification.

For example, in the aforementioned first embodiment, the engine output-additional amounts $\Delta P_{OD}$ and $\Delta P_{THS}$ are set to the amounts corresponding to the amount of charge in the battery, but note that it is not necessarily limited by the amount of charge in the battery. The engine output-additional amount $\Delta P$ may be set in accordance with a vehicle speed. FIG. 11 is a map illustrating an engine output-additional amount with respect to a vehicle speed in an HV Ve according to a modification. As illustrated in FIG. 11, in the OD lock mode, with an increase in the vehicle speed, an additional amount of output with respect to the engine 1 (engine output-additional amount $\Delta P_{OD}$) is set to increase from a state where it is steady at a predetermined lower limit ($\Delta P_{OD1}$) to a state where it is steady at a predetermined upper limit ($\Delta P_{OD2}$). Similarly, in the THS mode, with an increase in the vehicle speed, an additional amount of output with respect to the engine 1 (engine output-additional amount $\Delta P_{THS}$) is set to increase from a state where it is steady at a predetermined lower limit ($\Delta P_{THS1}$) to a state where it is steady at a predetermined upper limit ($\Delta P_{THS2}$). At any vehicle speed, the engine output-additional amount $\Delta P_{OD}$ in the OD lock mode is set to be less than the engine output-additional amount $\Delta P_{THS}$ in the THS mode ($\Delta P_{OD} < \Delta P_{THS}$). Instead of the vehicle speed, it should be noted that the engine output-additional amount $\Delta P$ may be set in accordance with an accelerator position angle (required driving force). Even in this case, a map illustrating a relationship between the accelerator position angle and the engine output-additional amount $\Delta P$ has a tendency similar to the map of the engine output-additional amount illustrated in FIG. 11.

In a control device for a hybrid vehicle according to an embodiment of the present disclosure, while the hybrid vehicle is traveling in an overdrive lock mode or in an electric motor lock mode, output torque of an engine is made less than output torque of the engine while the hybrid vehicle is traveling in a state where the overdrive lock mode or the electric motor lock mode is canceled so that it is possible to prevent fluctuations in engine speeds. Therefore, even when the hybrid vehicle is traveling in the overdrive lock mode or in the electric motor lock mode, it is possible to prevent a gear rattle or a muffled noise.

According to an embodiment, an engine output-additional amount with respect to output of an engine is controlled so that a magnitude of torque output from the engine in an engaged state is made less than a magnitude of torque output from the engine when an engine speed in a disengaged state is equivalent to that in the engaged state.

According to an embodiment, the engine output-additional amount with respect to the output of the engine may be changed in accordance with an amount of charge in a battery so that it is possible to control a power generation amount generated by an electric motor and to optimally adjust the amount of charge with respect to the battery.

According to an embodiment, as the operation of an exhaust gas recirculation system is stopped while a hybrid vehicle is traveling in an overdrive lock mode or in an electric motor lock mode, it is possible to reduce fluctuations in rotating speed of the engine caused by using the exhaust gas recirculation system, which prevents an occurrence of an abnormal noise such as a gear rattle and a muffled noise caused by the fluctuation in rotating speeds in the engine.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for a hybrid vehicle, comprising:
an engine;
an electric motor;
a power distribution mechanism including an input element which is connected to the engine, an output element which transmits power toward an output shaft, and a reaction force element which is fixed selectively and non-rotatably and brings about a reaction force against power output from the engine, and configured to distribute power from the engine to the electric motor and the output shaft;
a brake mechanism configured to selectively switch between an engaged state in which the reaction force element is fixed non-rotatably and a disengaged state in which the reaction force element is rotatably disengaged; and
a control unit configured to control a magnitude of torque output from the engine in the engaged state to be less than the magnitude of torque output from the engine in the disengaged state when an engine speed in the disengaged state is equivalent to the engine speed in the engaged state,
wherein the control unit is configured to control an engine output additional amount with respect to an output of the engine in the engaged state to be less than the engine output-additional amount with respect to the output of the engine in the disengaged state when the engine speed in the disengaged state is equivalent to the engine speed in the engaged state, and
the control device, further comprising:
a battery configured to charge electric power generated by the electric motor,
wherein as an amount of charge in the battery increases, the control unit is configured to reduce the engine output-additional amount with respect to the output of the engine in the engaged state or the engine output-additional amount with respect to the output of the engine in the disengaged state from a predetermined upper limit to a predetermined lower limit.

2. The control device for a hybrid vehicle according to claim 1, wherein the engine includes an exhaust gas recirculation system, and the control unit is configured to start an operation of the exhaust gas recirculation system when the fixing unit is in the disengaged state and stop the operation of the exhaust gas recirculation system when the brake mechanism is in the engaged state.

* * * * *